United States Patent [19]

Kawamura

[11] Patent Number: 5,784,105
[45] Date of Patent: Jul. 21, 1998

[54] VIDEO CAMERA WITH BUILT-IN SECONDARY BATTERY

[75] Inventor: Masaharu Kawamura, Kanagawa-ken, Japan

[73] Assignee: Canon Kabushiki Kaisha, Tokyo, Japan

[21] Appl. No.: 811,298

[22] Filed: Mar. 4, 1997

Related U.S. Application Data

[63] Continuation of Ser. No. 387,016, Feb. 10, 1995, abandoned, which is a continuation of Ser. No. 76,543, Jun. 14, 1993, abandoned.

[30] Foreign Application Priority Data

Jun. 19, 1992 [JP] Japan ................................ 4-184772

[51] Int. Cl.[6] .......................... H04N 5/225; H04N 5/222
[52] U.S. Cl. .................... 348/372; 348/375; 396/301; 396/279
[58] Field of Search ........................ 348/372, 373, 348/375, 207; 396/301, 279, 539

[56] References Cited

U.S. PATENT DOCUMENTS

| | | | |
|---|---|---|---|
| 4,782,355 | 11/1988 | Sasaki et al. | 348/372 |
| 4,792,762 | 12/1988 | Shinna et al. | 324/426 |
| 4,920,307 | 4/1990 | Iketani | 320/28 |
| 4,965,462 | 10/1990 | Crawford | 348/372 |
| 5,164,761 | 11/1992 | Isono et al. | 354/468 |
| 5,220,369 | 6/1993 | Sasaki | 348/373 |
| 5,424,800 | 6/1995 | Suzuki | 354/484 |

*Primary Examiner*—Leo Boudreau
*Assistant Examiner*—Bipin Shalwala
*Attorney, Agent, or Firm*—Robin, Blecker, Daley and Driscoll

[57] ABSTRACT

A video camera comprises a built-in secondary battery, a terminal used for connection with an external power source, and a main switch for controlling the supply of electric power to a circuit part provided for a control system and a signal processing system. The video camera is arranged such that the circuit part is connected to the built-in secondary battery or to the external power source when the main switch is closed and that the built-in secondary battery can be connected to the external power source when the main switch is open.

22 Claims, 2 Drawing Sheets

VIDEO CAMERA WITH BUILT-IN SECONDARY BATTERY

This is a continuation application under 37 CFR 1.62 of prior application Ser. No. 08/387,016, filed Feb. 10, 1995 abandoned which is a continuation of application Ser. No. 08/076,543, filed Jun. 14, 1993 abandoned.

BACKGROUND OF THE INVENTION

1. Field of the Invention

This invention relates to a video camera and more particularly to a power source device thereof.

2. Description of the Related Art

The conventional video camera has been arranged to be rendered operative with an electric power applied to the circuit of a signal processing system and that of a control system by mounting a long-life secondary rechargable battery such as a nickel-cadmium battery on the outside of the video camera, because the power consumption by the circuit of each part of the video camera is extremely large and, thus, the battery is vigorously consumed, so that it is necessary to frequently replace the battery. However, the nickel-cadmium battery used for the power source device of the video camera has a memory action. The memory action makes a difference in power consumption capacity between a case where the battery is charged when the electric energy of the battery is consumed only halfway and another case where the battery is charged after its electric energy has been used up. In the former case, the battery capacity cannot be fully used. To solve this problem, the video camera is sometimes provided with a device having a refresh type charger which is arranged to completely consume any remnant of electric energy of the battery before charging. However, the power source device of this type necessitates a complex arrangement and thus presents another problem. Therefore, it has been considered to be advantageous for operation to have the battery arranged separately from the video camera. However, the discrete battery arranged separately from the video camera solves only the physical problems relative to the circuitry and the battery itself in terms of operation. The battery arrangement necessitates the operator of the video camera to perform troublesome and complex operations such as mounting and demounting discrete batteries before the use of the video camera. Meanwhile, as a result of the recent advancement of technology, the structural arrangement of the video camera has been simplified to facilitate various operations on the video camera. A first step of the technological advance is a reduction in power consumption by the circuits of the video camera. An increase in the integration density of semiconductors, the adoption of digital circuits, etc., have come to permit the reduction of current consumption to half as compared with the conventional amount of consumption. Some of the video cameras recently developed are capable of continuing a recording for more than one hour by using a small battery.

A second step of the technological advance is an improvement in batteries. For example, a secondary battery such as a nickel-hydrogen battery or a lithium-ion battery is smaller in size and lighter in weight than the conventional nickel-cadmium battery. In addition to that, the improved battery does not show the above-stated memory action, so that its intrinsic capacity can be fully reproduced by charging them it in any state. However, the improvement in secondary batteries still leaves a problem as to how to charge the secondary battery when the electric energy of the battery is used up during the process of shooting. The problem remains to be solved.

SUMMARY OF THE INVENTION

This invention is directed to the solution of the above-stated problems of the prior art. It is, therefore, an object of the invention to provide a video camera having a power source device which eliminates the operational shortcomings of the conventional device resulting from the troublesome use of an external battery and is simply arranged to ensure ease of operation.

To attain this object, a video camera arranged according to this invention as an embodiment thereof is provided with a built-in secondary battery, a terminal used for connection to an external power source, and a main switch arranged to control supply of electric power to a circuit part for control and signal processing systems. The arrangement of the video camera according to this invention is as follows. The circuit part is connected either to the built-in secondary battery or to the external power source when the main switch is closed. The built-in secondary battery can be connected to the external power source when the main switch is open.

Further, in a case where the video camera is provided with means for detecting the mounting of the external power source, the external power source is connected in such a way as to supply electric power to the circuit part from the external power source when the external power source is mounted on the video camera. In this instance, the circuit part is disconnected from the built-in secondary battery.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
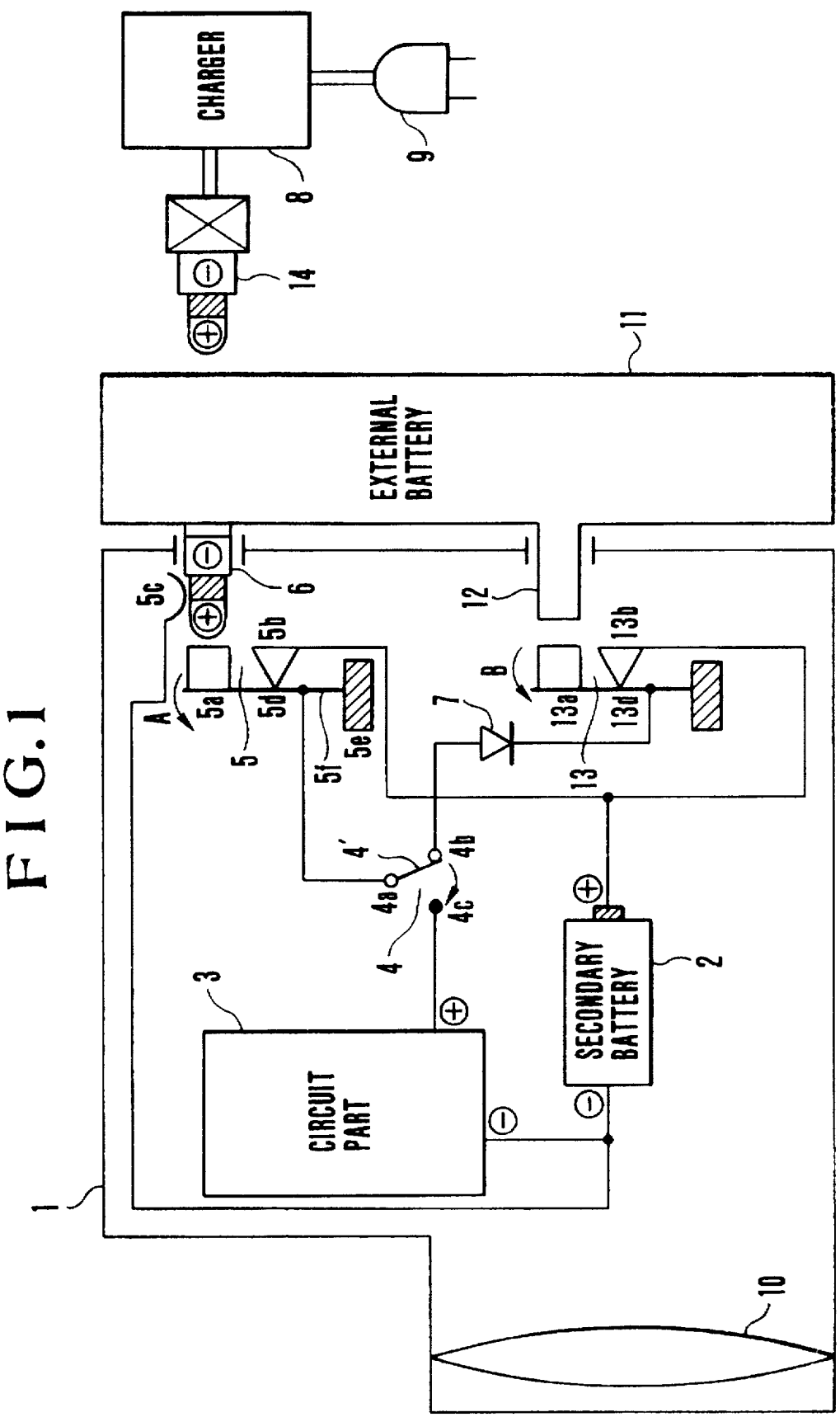
FIG. 1 is a circuit block diagram showing in outline the arrangement of the essential parts of one embodiment of this invention.

FIG. 1 is a circuit block diagram showing in outline the arrangement of the essential parts of one embodiment of this invention. The illustration includes a video camera body 1 and a lens 10. Among the component parts of the video camera arranged in a known manner, all the parts that are not directly related to this invention are omitted from the illustration.

In FIG. 1, reference numeral 5 denotes an external power input terminal part. A state in which a connection terminal 6 or 14 is not inserted from outside to the external power input terminal part 5 is first described as follows. With the video camera in this state, the contacts 5b and 5d of the external power input terminal part 5 are kept in contact with each other. A main switch 4 is arranged to be operated by the operator of the video camera. In FIG. 1, the contacts 4a and 4b of the main switch 4 are shown as in connection with each other, so that the supply of electric power from a built-in secondary battery 2 is not effected. When the main switch 4 is turned on by the operator in this state, a contact piece 4' moves from the contact 4b to a contact 4c so as to connect the contact 4a to the contact 4c. Under this condition, the positive output of the built-in secondary battery 2 is connected to a circuit part 3 of the video camera through the contacts 5b and 5d of the external power input terminal part 5 and the contacts 4a and 4c of the main switch 4. The circuit part 3 includes circuits necessary for the various actions of the video camera, such as an image pickup process for picking up an object image formed through the lens 10, a process of recording a signal obtained by the image pickup process on a recording medium, a process of reproducing thy signal recorded, a control over the system of the video camera, etc. The negative side of the built-in secondary battery 2 is constantly connected to the circuit part 3. The built-in secondary battery 2 is thus arranged to supply electric power to the circuit part 3. The supply of electric power is of course cut off when the main switch 4 is turned off.

Next, a state obtained when the connection terminal 6 is inserted into the video camera body 1 from an external battery 11 is described. The external battery 11 which is a lithium-ion battery or the like is used mostly in cases where the remaining amount of electric energy of the built-in secondary battery 2 becomes small. When the external battery 11 is mounted on the video camera body 1, with the operator having been informed of an excessively decreased state of the electric energy of the built-in secondary battery 2, for example, by a warning display showing that state, the connection terminal 6 and a projection 12 are inserted into the video camera body 1. The electric energy (power) of the external battery 11 is outputted through the connection terminal 6. The connection terminal 6 consists of a positive terminal part and a negative terminal part as shown in FIG. 1.

With the connection terminal 6 inserted into the video camera body 1, the positive terminal part of the connection terminal 6 comes into contact with the contact 5a of the external power input terminal part 5 and further pushes the contact 5a to move in the direction of arrow A as shown in FIG. 1. A support part 5f which is carrying the contact 5a has some elasticity. The movement of the contact 5a then causes the elastic support part 5f to swing on a fixed part 5e of the video camera body 1 which is electrically isolated and serves as a fulcrum for the support part 5f. The elasticity of the support part 5f acts in the direction of keeping the contacts 5b and 5d in contact with each other when the connection terminal 6 is not inserted. When the connection terminal 6 is inserted, the contacts 5b and 5d are detached from each other because the contact 5a then moves in the direction of arrow A.

Further, with the connection terminal 6 inserted, the negative terminal part of the connection terminal 6 comes into contact with a contact 5c. If the main switch 4 is in an off-state under this condition, detection means for detecting mounting of the external battery works. More specifically, the external battery mounting detection means is arranged as follows. A connection line from the contact 5a is connected to a diode 7 through the contacts 4a and 4b of the main switch 4. Meanwhile, a contact 13a of a switch 13 which is arranged similarly to the external power input terminal part 5 is pushed by the projection 12 of the external battery 11 in the direction of arrow B so as to detach other contacts 13b and 13d of the switch 13 from each other. The output of the external battery 11 thus becomes open.

When the main switch 4 is turned on, the contacts 4a and 4c of the main switch 4 are connected to each other. The output from the positive terminal part of the connection terminal 6 of the external battery 11 is connected to the circuit part 3 of the video camera body 1 to supply electric power to the circuit part 3. With the external battery 11 mounted on the video camera body 1, therefore, the circuit part 3 can be controlled by turning on or off the main switch 4 in exactly the same manner as when the built-in secondary battery 2 is in use. If the video camera is arranged to have the built-in secondary battery 2 and the external battery 11 connected in parallel, the operator mounts the external battery 11 on the video camera body 1 with the built-in secondary battery 2 in a state of having been used up, as mentioned in the foregoing. Then, with the external battery 11 mounted, a charging current flows to the built-in secondary battery 2 from the external battery 11. As a result, the voltages of both of these batteries would drop to render the video camera inoperative as the battery voltage obtained by turning the main switch 4 on would be lower than the working voltage of the circuit part 3. The switch 13 is necessary for preventing this trouble.

When a connection terminal 14 of a battery charger 8 is inserted into the video camera body 1, the embodiment operates as follows. The battery charger 8 is arranged to receive power from a commercial power line at a terminal 9. In this case, the battery charger 8 is usable for two purposes. Namely, the battery charger 8 is used for charging the built-in secondary battery 2 and, in addition to that purpose, the battery charger 8 is usable in operating the video camera over a long period of time for recording, record reproduction from a tape, etc., without any fear for excessively consuming the built-in secondary battery 2. The output of the battery charger 8 is obtained from the connection terminal 14. As shown in FIG. 1, the terminal 14 consists of a positive terminal part and a negative terminal part.

When the connection terminal 14 of the battery charger 8 is inserted into the video camera body 1, the positive terminal part of the connection terminal 14 comes into contact with the contact 5a in the same manner as when the terminal 6 of the external battery 11 is inserted. The positive terminal part of the connection terminal 14 then pushes the contact 5a to move in the direction of arrow A. Therefore, the contacts 5b and 5d are detached from each other. The output of the battery charger 8 from the positive terminal part of the connection terminal 14 is thus connected to the contact 5a. The negative terminal part of the connection terminal 14 is then connected to the contact 5c. Under this condition, if the main switch 4 is in its off-state, the supply of electric power from the contact 5a acts to charge the built-in secondary battery 2 through the contacts 4a and 4b of the main switch 4 and also through the diode 7 as the switch 13 is closed in this instance.

When the main switch 4 is closed, the contacts 4a and 4c of the main switch 4 are connected to each other. The output of the battery charger 8 coming through the positive terminal part of the connection terminal 14 is then connected to the circuit part 3 of the video camera body 1. In this state, electric power is supplied from the battery charger 8 to the circuit part 3. This state is necessary in a case where the circuit part 3 is to be operated over a long period of time for recording, or reproducing a record from a tape, or the like, by supplying electric power from outside without using the built-in secondary battery 2.

Figure 2:
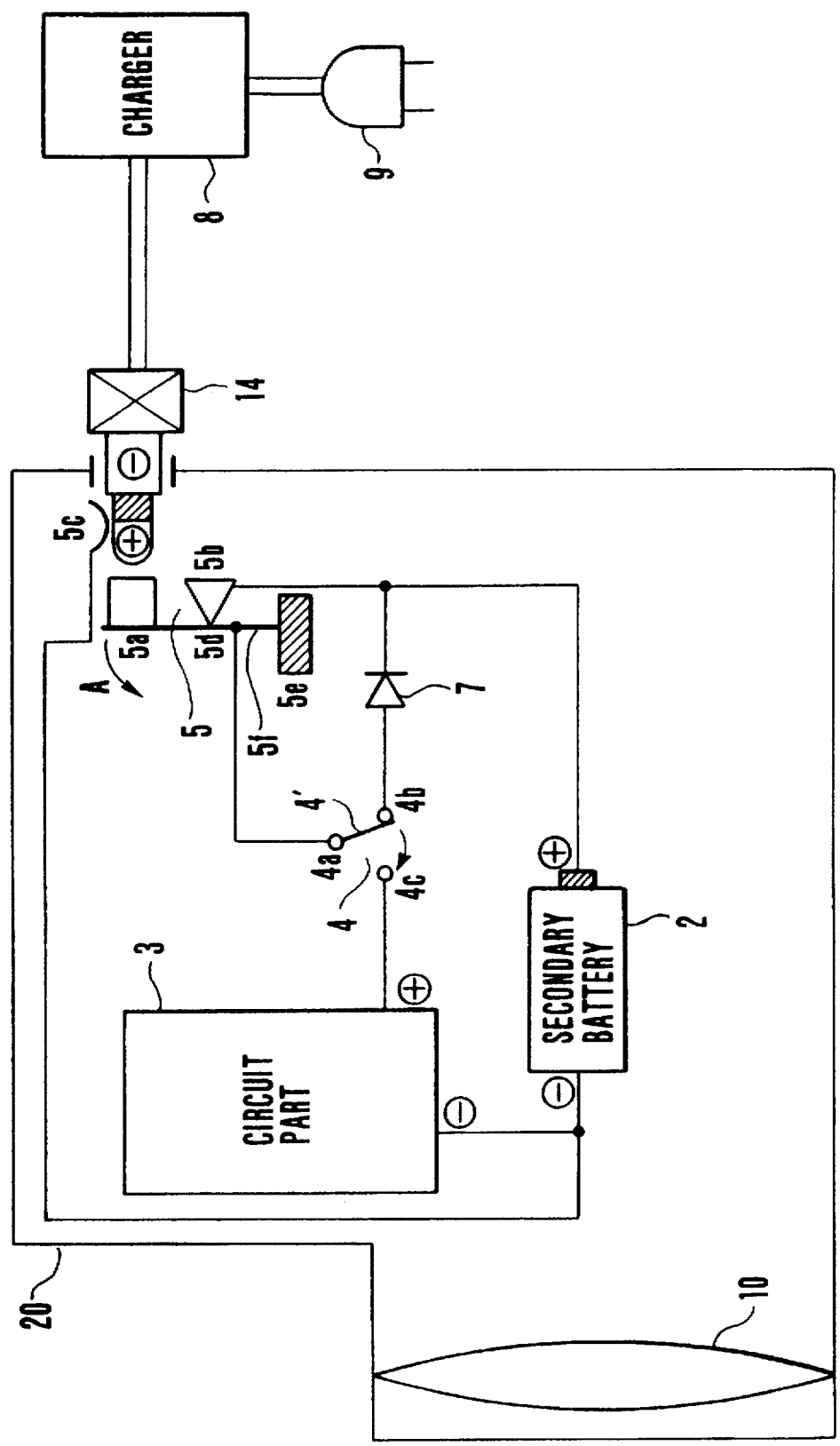
FIG. 2 is a circuit block diagram showing the arrangement of another embodiment of this invention.

FIG. 2 shows in a circuit block diagram the arrangement of a video camera which is arranged according to this invention as another embodiment thereof. In FIG. 2, all the parts that are arranged in the same manner as or to function equivalently to those shown in FIG. 1 are indicated by the same reference numerals and the details of them are omitted from the following description.

Referring to FIG. 2, the main switch 4 is arranged to be operated by the operator. In FIG. 2, the video camera is shown in a state in which electric power is not supplied from the built-in secondary battery 2. When the main switch 4 is turned on in this state, the contact piece 4' moves from the contact 4b to the contact 4c to connect the contact 4a to the contact 4c. Under this condition, the positive output of the built-in secondary battery 2 is connected to the circuit part 3 through the contacts 5b and 5d of the external power input terminal part 5 and also through the contacts 4a and 4c of the main switch 4. The negative side of the built-in secondary battery 2 is constantly in connection with the circuit part 3 as shown in FIG. 2. Therefore, with the main switch 4 turned on, electric power is supplied from the built-in secondary battery 2 to the circuit part 3. Next, the following describes the operation of the embodiment to be performed with the connection terminal 14 of the battery charger 8 inserted into the video camera body 20.

The battery charger 8 is arranged to receive electric power from a commercial power line at a terminal 9. The battery charger 8 is usable for two different purposes. Namely, the battery charger 8 is used for charging the built-in secondary battery 2 and, in addition to that, the battery charger 8 is usable in operating the video camera over a long period of time for recording, reproduction of a record from a tape, etc., without any fear for consuming the built-in secondary battery 2. The output of the battery charger 8 is arranged to be obtained through the connection terminal 14 mentioned above.

The connection terminal 14 consists of positive and negative terminal parts as shown in FIG. 2. When the connection terminal 14 is inserted into the video camera body 20, the positive terminal part comes into contact with the contact 5a and pushes the the contact 5a to move in the direction of arrow A as shown in FIG. 2. The contact 5a is carried by the support part 5f which is elastic. The movement of the contact 5a causes the support part 5f to swing on the electrically isolated fixed part 5e of the video camera body 20. The elasticity of the support part 5f is arranged to act in such a way as to keep the contacts 5b and 5d in contact with each other when the connection terminal 14 is not inserted. When the connection terminal 14 is inserted, the contacts 5b and 5d are detached from each other and the positive output of the battery charger 8 is connected to the contact 5a. The negative terminal part of the connection terminal 14 is then connected to the contact 5c.

With the main switch 4 in an off-state under this condition, the supply of electric power through the contact 5a acts to charge the built-in secondary battery 2 through the contacts 4a and 4b of the main switch 4 and the diode 7.

When the main switch 4 is turned on, the contact 4a is connected to the contact 4c to allow the positive output of the battery charger 8 to be connected to the circuit part 3 of the video camera body 20 so as to supply electric power to the circuit part 3. The state obtained in this manner is necessary in operating the video camera over a long period of time for recording, reproducing a record from a tape, etc., with electric power supplied from the external power source, instead of using the built-in secondary battery 2.

As apparent from the foregoing, the embodiments described simplify and facilitate the operations to be carried out by the operator in connecting the external battery charger for charging the built-in secondary battery and in using the external battery when the electric energy of the built-in secondary battery is consumed.

Further, in accordance with this invention, one and the same terminal can be arranged on the video camera body to serve as a charging power input terminal and also as an external power input terminal. This arrangement not only allows further reduction in size of the video camera but also allows more latitude for design.

What is claimed is:

1. A video camera, comprising:
   a) a case;
   b) an internal power source including a rechargeable battery disposed within said case;
   c) connection means arranged on said case to permit connection with an external power source which is arranged to convert electric power from a commercial power line into direct power;
   d) processing means arranged within said case to perform at least one process for said video camera; and
   e) a power switch including three terminals, a first terminal arranged to connect said processing means, a second terminal arranged to connect said internal power sources, a third terminal arranged to connect said connection means and said internal power source, said power switch arranged to move between a first position and a second position, wherein said power switch arranged to connect said first terminal to said third terminal when said power switch is in the first position and arranged to connect said second terminal to said third terminal when said power switch is in the second position, wherein the connection of said third terminal with said internal power source being inhibited when said external power source is connected to said connection means.

2. A video camera according to claim 1, wherein said internal power source is arranged to be charged by said external power source when said switch means is in said second state.

3. A video camera according to claim 1, further comprising control means arranged to restrict connection between said processing means and said internal power source when said external power source is connected to said connection means.

4. A video camera according to claim 3, wherein said connection means includes said control means.

5. An electronic apparatus comprising:
   a) a case;
   b) an internal power source including a rechargeable battery disposed within said case;
   c) connection means arranged on said case to permit connection to either one of a first external power source and a second external power source;
   d) processing means arranged within said case to perform at least one process for said electronic apparatus;
   e) switch means arranged to connect said processing means to either one of said internal power source and said first and second external power sources when said switch means is in a first state and to connect said internal power source to said external power source when said switch means is in a second state;
   f) detecting means arranged at said case to detect mounting of said second external power source on said case; and
   g) control means arranged to restrict connection between said internal power source and said processing means when mounting of said second external power source on said case is detected by said detection means.

6. An apparatus according to claim 5, wherein said first external power source is arranged to convert electric power a commercial power line into direct power.

7. An apparatus according to claim 6, wherein said internal power source is arranged to be charged by said first external power source when said switch means is in said second state.

8. An apparatus according to claim 5, wherein said detection means includes said control means.

9. An apparatus according to claim 5, wherein said second external power source is a rechargable battery.

10. An apparatus according to claim 9, wherein said second external power source has a projection arranged to actuate said detection means.

11. A video camera comprising:
   a) a circuit part inclusive of image pickup means arranged to pick-up an image of an object and to output an image signal and recording means for recording the image signal on a recording medium;
   b) a case arranged to house therein said image pickup means and said recording means;
   c) an internal power source including a rechargeable battery disposed within said case;
   d) connection means arranged on said case to permit connection either to a first external power source or to a second external power source;
   e) processing means arranged within said case to perform at least one process for said video camera;
   f) switch means arranged to connect said processing means either to said internal power source or to said first or second external power source when said switch means is in a first state and to permit connection between said internal power source and said first external power source to allow said internal power source to be charged by said first external power source when said switch means is in a second state;
   g) detection means arranged at said case to detect mounting of said second external power source on said case; and
   h) control means arranged to restrict connection between said internal power source and said processing means when mounting of said second external power source is detected by said detecting means.

12. A video camera according to claim 11, wherein said first external power source is arranged to convert electric power from a commercial power line into direct power.

13. A video camera according to claim 11, wherein said detection means includes said control means.

14. A video camera according to claim 11, wherein said second external power source is a rechargable battery.

15. An electronic apparatus comprising:
   a) a case;
   b) an internal power source including a rechargeable battery disposed within said case;
   c) connection means arranged on said case to permit connection to either one of a first external power source and a second external power source;
   d) processing means arranged within said case to perform at least one process for said electronic apparatus;
   e) switch means arranged to connect said processing means to either one of said internal power source and said first and second external power sources when said switch means is in a first state and to connect said internal power source to said external power source when said switch means is in a second state;
   f) detecting means arranged at said case to detect mounting of said second external power source on said case; and
   g) control means arranged to restrict connection between said internal power source and said second external power source when mounting of said second external power source on said case is detected by said detection means.

16. An apparatus according to claim 15, wherein said first external power source is arranged to convert electric power to a commercial power line to direct power.

17. An apparatus according to claim 16, wherein said internal power source is arranged to be charged by said first external power source when said switch means is in a second state.

18. An apparatus according to claim 15, wherein said detection means includes said control means.

19. An apparatus according to claim 15, wherein said second external power source is a secondary battery.

20. An apparatus according to claim 19, wherein said second electric power source has a projection arranged to actuate said detection means.

21. A video camera according to claim 5, wherein:
said power switch has three terminals.

22. A video camera according to claim 11, wherein:
said power switch has three terminals.

* * * * *